United States Patent [19]
Buck

[11] 3,962,557
[45] June 8, 1976

[54] WASTE METAL REMOVAL IN E.D.M. MACHINING

[76] Inventor: Homer G. Buck, 1000 SE. Bay Blvd. No. 14F, Newport, Oreg. 97365

[22] Filed: Jan. 30, 1975

[21] Appl. No.: 545,696

[52] U.S. Cl. .......................... 219/69 D; 219/69 E; 219/69 M
[51] Int. Cl.² .......................................... B23P 1/12
[58] Field of Search ............ 219/69 D, 69 E, 69 M, 219/69 V, 69 R

[56] References Cited
UNITED STATES PATENTS

| | | | |
|---|---|---|---|
| 3,144,541 | 8/1964 | Hill | 219/69 D |
| 3,177,337 | 4/1965 | Kohles | 219/69 E |
| 3,271,283 | 9/1966 | Clifford et al. | 219/69 V |
| 3,542,993 | 11/1970 | Buck | 219/69 V |
| 3,796,851 | 3/1974 | Pfaff | 219/69 M |

*Primary Examiner*—Bruce A. Reynolds
*Attorney, Agent, or Firm*—Frederick E. Mueller

[57] ABSTRACT

A workpiece having a surface of revolution to be machined by electrical discharge is encased by a housing while being rotated in a dielectric liquid bath in spaced relation to a matrix electrode. The workpiece containing cavity of the housing is formed with a machining zone slot through which surface traces of the workpiece are brought into registration with a matrix surface of the electrode, the clearance between one edge of the slot and an EDM machined area of the workpiece defining an inlet through which the dielectric fluid is inducted to the interior of the housing. A portion of the cavity is larger than the workpiece providing a plenum for relatively free passage of the metal particulate entraining liquid, which is exhausted through an outlet port of the housing to be pumped to the sump of the EDM machine. The remaining portion of the cavity is closely matingly complementary to the surface of revolution, only slightly larger in radius than the workpiece, and the unmachined area or radially outwardly projecting portions of the machined area standing out in relief restrict or impede circulation of the liquid reversely around the workpiece and back towards the machining zone slot.

16 Claims, 4 Drawing Figures

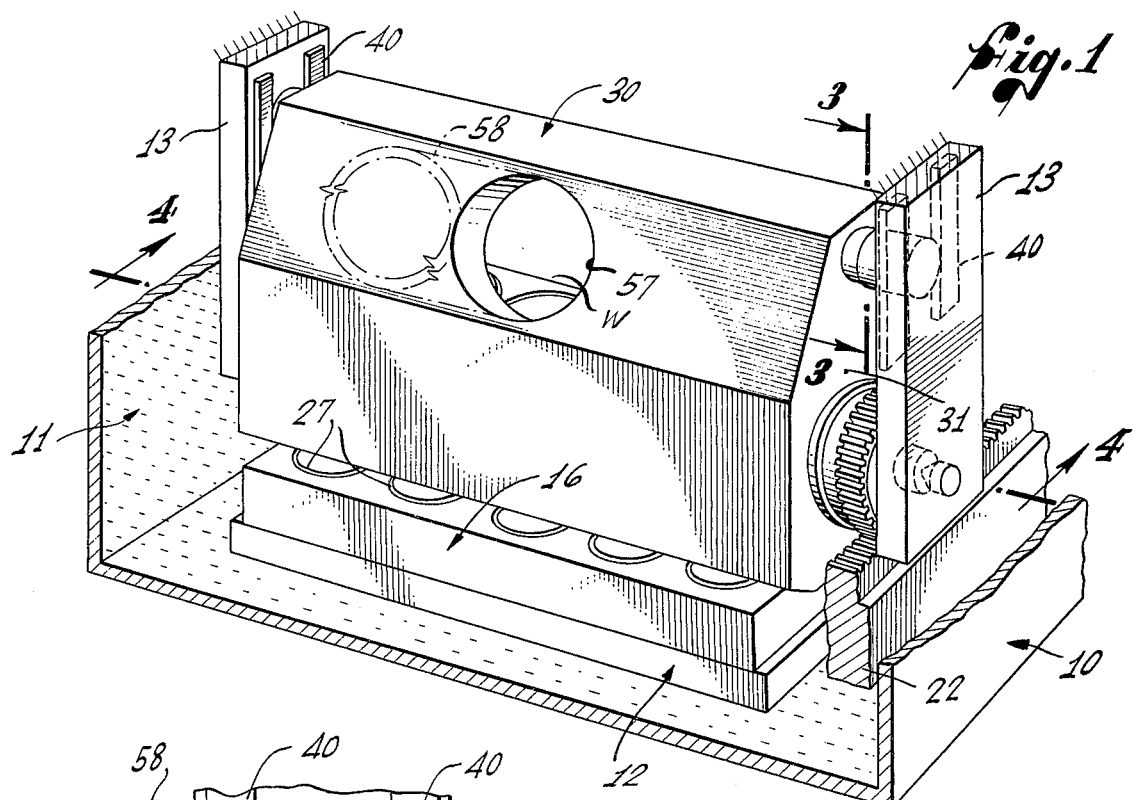
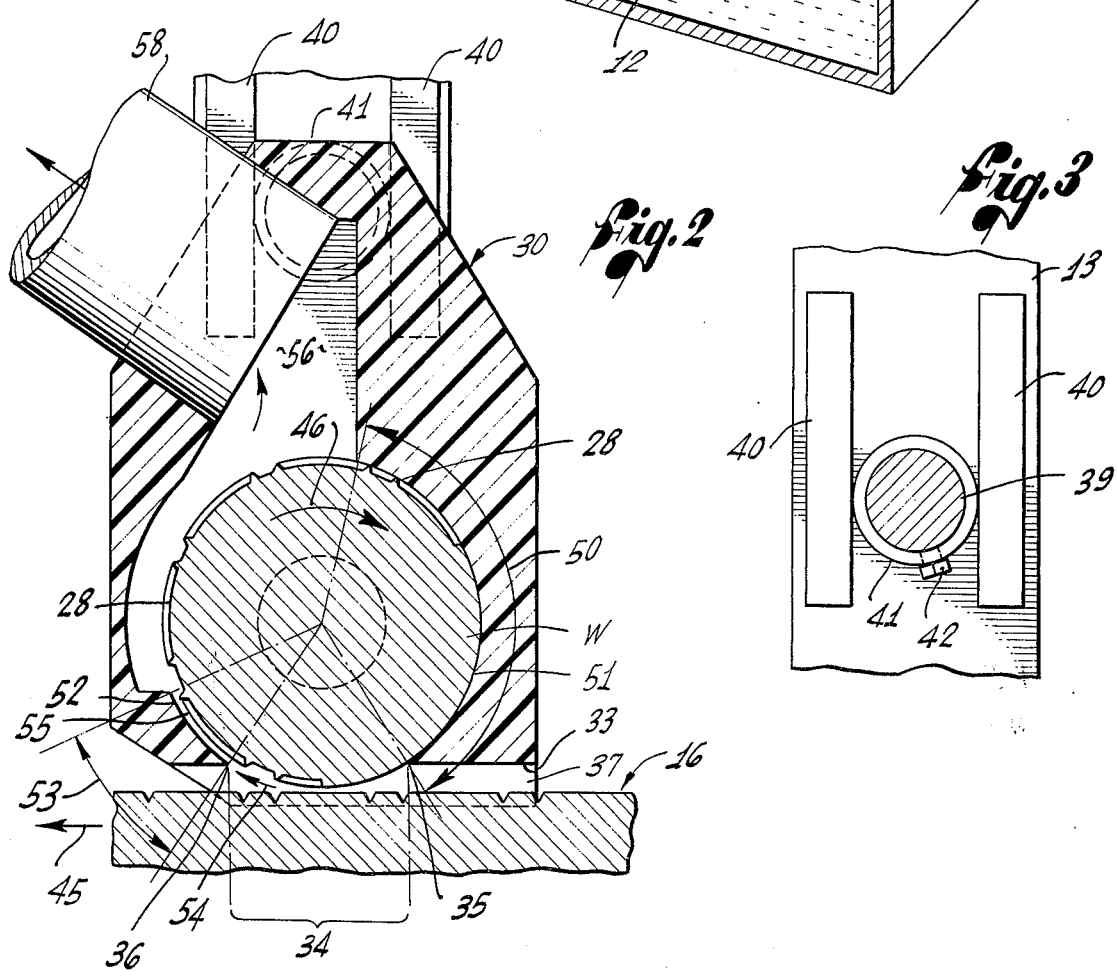

WASTE METAL REMOVAL IN E.D.M. MACHINING

BACKGROUND OF THE INVENTION

The present invention relates to the electrical discharge machining of rotary dies or the like from workpieces which are bodies of revolution and, more particularly, to an improved means for removing from the EDM machining zone the waste particles of metal eroded from the workpiece.

As is disclosed in my U.S. Pat. No. 3,542,993, a rotary die may be electro-erosively machined from a plain cylindrical workpiece by forming a flat electrode with a negative impression of the surface pattern desired to be imparted to the die. The workpiece and matrix electrode are then moved relative to one another in order to sequentially bring longitudinal traces of the rotating cylindrical workpiece into registration with transverse traces of the matrix surface in the proper spark gap relationship. During the machining process, the dielectric and coolant liquid is preferably continuously circulated through the tank in which the machining takes place.

This process may be performed on a wide variety of EDM machines in which the matrix electrode is preferably held horizontally, as on a vacuum table, for traversing movement past a workpiece that rotates thereover. A graphite electrode is preferred since it can be readily machined into a pattern of grooves or the like to define a flat development of a negative impression of the die pattern desired to be machined into the smooth cylindrical surface of the workpiece. However, despite the continuous recirculation of the machining fluid, some of the particles of metal electro-erosively removed from the workpiece settle within the depressions of the matrix, as well as being dispersed in the tank. As a result, the matrix pattern is gradually deformed and successive workpieces are correspondingly defectively machined.

SUMMARY OF THE INVENTION

A housing, formed of an electrically non-conducting material, has a cavity between its opposite end walls to receive that portion of the die workpiece between its preformed bearers. Each bearer passes through one of the end walls with a close rotary fit to dispose the opposite end studs of the workpiece outwardly of the housing to be rotationally supported on a coaxially opposed pair of centers or spindles carried by a ram or an arbor of the EDM machine. That surface of the housing which confronts the matrix electrode, e.g., the lower surface, is formed with a transverse slot extending between the side walls through which a protruding arcuate sector of the workpiece rotates during relative movement of the workpiece and electrode, in the machining zone. In order to maintain the housing in this orientation of its machining zone slot, a bracket means is provided between the housing and the arbor framework to key the housing in place.

In typical cross-section, an arcuate sector of the housing cavity has a radius defining a close running fit with the workpiece being rotated therein and defining a sharp edge intersection with one side of the machining zone slot of the housing. The balance of the typical cavity cross-section is of larger radius than the workpiece with a relatively large clearance between the workpiece and the other transverse edge of the machining zone slot and, also, including a large plenum for freely passing liquid inducted through the clear side of the machining zone slot to an exhaust port connected to a hose or the like for returning the liquid to the sump for subsequent filtration of the waste metallic particles out of the returning liquid. The relationship of the housing, the rotary element therein, and the electrode element in effect defines a barrier to any flow of liquid out of the tank or around the encased element otherwise than through the machining zone for direct induction into the housing and subsequent exhaust to an external location where the waste particles can be separated from the liquid.

BRIEF DESCRIPTION OF THE DRAWINGS

FIG. 1 is a schematic, partially cut-away, perspective view of EDM apparatus incorporating the invention.

FIG. 2 is a transverse sectional view, on a larger scale, of the apparatus of FIG. 1.

FIG. 3 is a partial sectional view, on a larger scale, taken on the line 3—3 of FIG. 1.

DESCRIPTION OF THE PREFERRED EMBODIMENT

Figure 4:
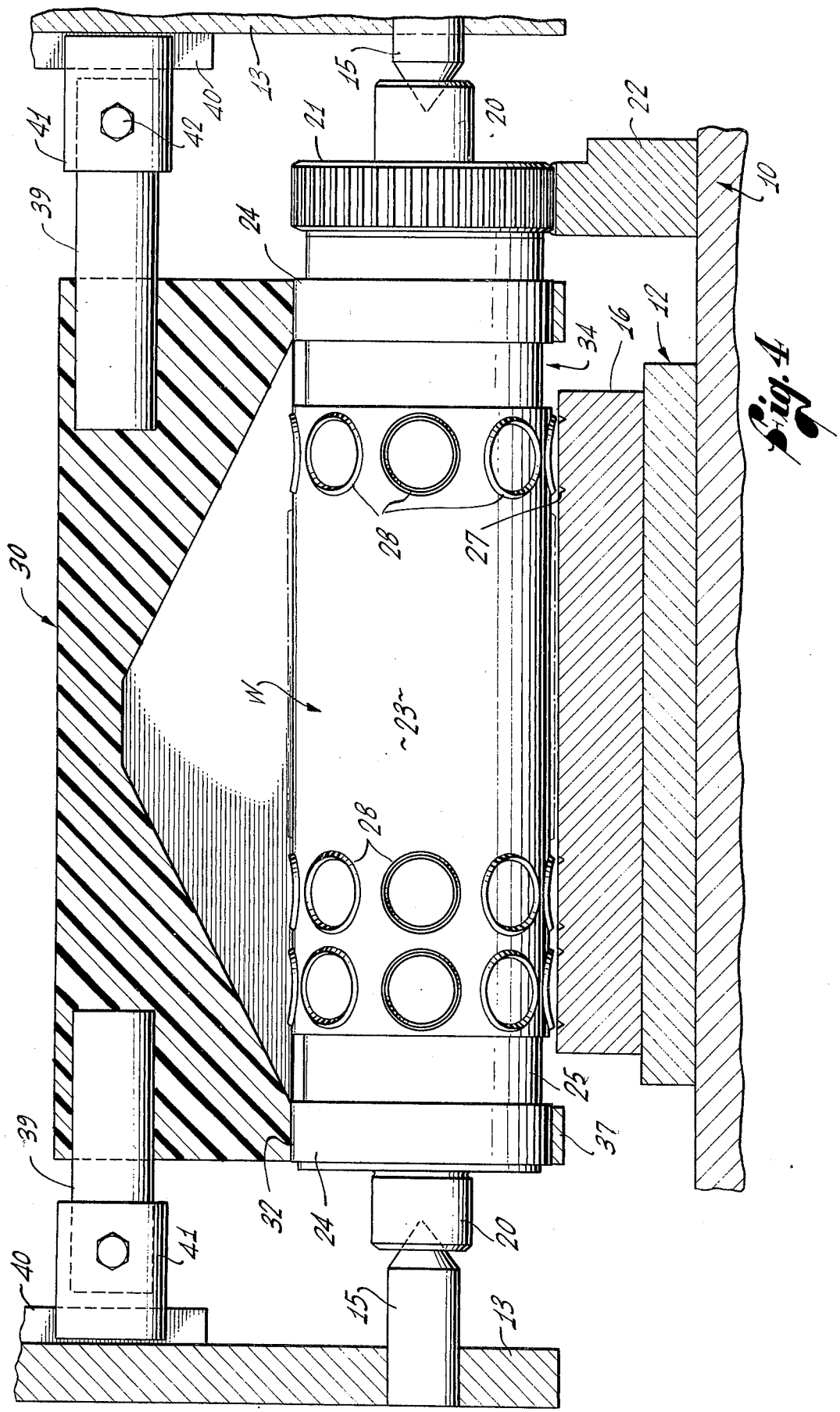
FIG. 4 is a longitudinal sectional view taken on the line 4—4 of FIG. 1.

The basic structure and mode of operation of the wide variety of EDM machines is well known. Accordingly, elements thereof are not disclosed in the drawings except to the extent required to illustrate the environment in which the present invention is employed. Suffice it to say that the apparatus includes a walled tank 10 for containing a quantity of dielectric liquid 11. In the arrangement schematically illustrated in FIG. 1, it will be understood that the floor of the tank 10 is secured to or may comprise a portion of a traversable work table of the apparatus and is equipped with a means for affixing an electrode thereto, in this case schematically illustrated as a vacuum table 12. Customarily, the apparatus includes a vertically adjustable ram and, for present purposes, the ram supports a fixedly spaced apart pair of vertically extending bracket members 13 projecting vertically downwardly to support a coaxially opposed pair of centers or spindles 15 for rotatably supporting the workpiece having a surface of revolution. An electrode having been secured to, e.g., the vacuum table 12, and with the parts being included in an electrical circuit arranged for electrical discharge, arcing and electro-erosion of the workpiece takes place after the ram has been lowered to bring the electrode and workpiece to the proper spark gap spaced relationship, for example on the order of 2/1000 of an inch (0.002 inch).

For purposes of illustration only, it will be assumed that it is desired to convert a cylindrical workpiece into a rotary die for cutting self adhesive backed labels in a roll of conventional laminated stock by means of a flat matrix electrode 16. For this purpose, the workpiece, generally designated at W, has the overall configuration best seen in FIG. 4, it being understood however, that workpiece is drawn in FIG. 4 as having been partly EDM machined, rather than in its totally unworked state. The workpiece is usually made of a hardened steel and, at opposite ends, has a pair of coaxial studs 20 center-drilled to receive the spindles 15. Adjacent one of the studs, the workpiece is integrally formed with a spur gear portion 21 for engagement with a similar spur gear of an anvil roll in a conventional webfed press after the workpiece has been converted to the desired die configuration. Advantage is taken of the spur gear 21 to effect rotation of the workpiece W synchronously with the linear rate of traverse of the die 16 by means of a rack 22 secured in parallel adjacent relationship to the electrode 16 and on to the floor of the tank 10. The major portion of the body of the workpiece comprises a die area 23 separated from an opposite end pair of plain bearing rollers or bearers 24 by circumferentially extending grooves 25.

The electrode 16, which is preferably of a carbon composition, has a flat upper surface with a matrix area which is the same as the cylindrical surface area of the unmachined die portion 23 of the workpiece W. In the illustrated case, the matrix area is machined to define a series of circular depressions of sharp V-shaped radial cross-section, as indicated at 27, constituting negative impressions of a series of circular blades 28 desired to be machined into the die section 23. In this connection, it will be understood that in the completed product, the circular blades 28 stand out in relief relative to the machined away portions of the die section 23 with their cutting edges remaining at substantially the diameter defined by the unmachined die section and at the same diameter as the bearers 24.

During machining, the workpiece W is mounted within a housing, made of an electrically non-conductive material, indicated generally at 30. The housing includes a pair of opposite end walls 31 formed with a coaxial pair of through bores 32 of a diameter to receive the bearers 24 in a close running fit and, preferably, each having an axial length corresponding to the axial length of the through bores 32. As is best seen in FIG. 2, a flat bottom face 33 of the housing 30 is formed with a longitudinally extending machining zone slot 34, through which an arcuate sector of the workpiece W projects. As viewed in FIG. 2, the opposite longitudinally extending edges of the machining zone slot 34 are indicated at 35 and 36, while the opposite narrow ends of the slot are closed by lowermost portions of the side walls 31, as indicated at 37.

During the machining operation, the level of the dielectric liquid 11 in the tank 10 is preferably of sufficient depth to cover the housing 30 after the ram has been lowered to bring the workpiece W into the proper spark gap relationship relative to the upper surface of the electrode 16. When the housing 30 is so immersed, the machining zone slot 34 is preferably disposed in a plane substantially parallel to that of the upper surface of the matrix electrode 16. The means for thus keying the housing 30 in the desired orientation may take the form of a pair of studs 39 affixed to and projecting from opposite ends of the housing 30 and adapted for engagement with vertically extending keyways defined on the confronting faces of the pair of bracket members 13. For example, referring to FIG. 3, each keyway may be defined by a parallel pair of vertically extending straps 40 affixed to the inside of the corresponding member 13. The lateral spacing between the bracket members 13 may be adjustable, if desired, and each of the studs 39 may be fitted with an axially slidable telescopic sleeve 41, each bearing a set screw 42 to secure to corresponding sleeve 41 in the adjusted position. As is indicated in FIG. 3, the outer diameter of the sleeves 41 is such as to be vertically slidably engageable between the confronting edges of the pair of keyway members 40. With this arrangement, different lengths and/or diameters of workpieces and correspondingly different sizes of housings therefor can be accommodated by a given adjustable set of bracket members 13.

The configuration of the cavity within the housing 30 within which the workpiece W rotates during machining is shown in FIGS. 2 and 4. As is indicated by the directional arrows 45 and 46 of FIG. 2, the machining occurs during relative movement of the electrode 16 and workpiece W. In the illustrated case, the workpiece W is held by the arbor or the like, including the bracket members 13, for rotation about a fixed axis. As the table of the EDM apparatus is traversed, in the direction indicated by the arrow 45, the rack and pinion engagement 21, 22 effects rotation of the workpiece W in the direction 46 at the same lineal speed as the lineal speed of the electrode 16. Consequently, longitudinally extending traces of the smooth cylindrical die section 23 are sequentially brought into registration with transverse traces of the matrix pattern formed in the upper face of the electrode 16, effecting electrical machining of the workpiece into the desired die configuration. During the machining process, the metal particles eroded from the workpiece are efficiently flushed out of the machining zone and inhibited from deposition within the matrix depressions as a result of the fluid passages defined between the lower face of the housing 30 and the upper face of the electrode 16, the configuration of the housing cavity, and the relationship of machined and unmachined portions of the die portion 23 relative to the housing cavity.

FIG. 2 is illustrative of a typical transverse cross-sectional configuration of that portion of the housing cavity within which the die area 23 of the workpiece W rotates. A substantial arcuate sector 50 of the cavity, concentric with the axis of rotation of the workpiece, has a wall 51 of a radius only slightly larger, e.g., a running fit, than that of the unmachined die section 23. The clearance, preferably, is only sufficient to permit rotation of the workpiece on a thin lubricating film of the dielectric liquid. In this connection, it will be recalled that the bearers 24 of the workpiece also have a close running fit in the side wall apertures 22 of the housing 30 and, preferably, only sufficient clearance to permit rotation on a thin lubricant film of the dielectric liquid. Thus, the housing 30, in effect, "floats" or is supported on the workpiece by a close running fit, with the aforementioned clearances being so slight as to almost entirely impede circulation of the dielectric liquid in the clearance spaces for the bearers 24 and die section 23. The arcuate wall 51 intersects the lower face 33 of the housing 30 at the edge 35 of the machining zone slot 34, at which edge the clearance is so slight as to vary greatly inhibit the entrance of liquid into the housing cavity therealong.

On the opposite side of the machining zone slot 34 from the arcuate sector 50, the housing cavity has an arcuate wall 52, whose angular extent is indicated by the sector 53, intersecting the lower face 33 of the housing at the opposite edge 36 of the machining zone slot. Wall 52 is of substantially larger radius than the radius of the die section 23. As a result, the dielectric liquid has relatively free passage out of the machining zone and into the housing cavity primarily through the relatively large clearance gap 55 between the edge 36 of the machining zone slot 34 and a confronting surface portion of the rotating workpiece, as indicated by the directional arrow 54. In this connection, it will be understood that the dielectric liquid is inducted into the clearance 55 from both sides of the sector of the workpiece W protruding through the machining zone slot since the liquid passing the edge 35 of the slot entirely bypasses that edge of the slot, due to the close fit thereagainst of the workpiece W.

The balance of the housing cavity is defined by walls having a very large clearance relative the die section 23 rotating therethrough, defining a large plenum 56. An exhaust port 57, mounting an exhaust pipe 58 ultimately having fluid communicating with the intake side of a pump, draws waste particle contaminated fluid from plenum 56 for conducting the liquid to an external location to a filtering means and to the sump of the EDM machine.

From the foregoing, it will be seen that waste particles removed from the workpiece (or from the electrode in some instances) are immediately flushed out of the machining zone immediately after removal from the workpiece and are promptly entrained into and through an exhaust passage means without significant opportunity to be dispersed into the dielectric liquid bath with the consequent probability of accumulating as undesirable deposits within the depressions of the matrix electrode and so causing a deformation of the matrix pattern. In this connection it will be noted that the closely fitting wall 51 of the housing cavity restricts the circulation of contaminated liquid thereover both with respect to machined and unmachined portions of the die therein. Unmachined portions of the workpiece substantially completely obstruct the entry of waste metal particles through the sector 50. Likewise, crests of the machined portions of the die such as, for example, the crests of the circular cutting blades 28, remain at substantially the original diameter of the die section 23 and thus act as dams preventing free passage of waste metal entrained in the dielectric liquid. Notwithstanding that there may be substantial clearance spaces between a plurality of surface designs or patterns of the machined workpiece, e.g., spaces between the blades 28, the flow resistance created by the machined patterns standing out in relief on the machined away portions of the workpiece provide a relatively great flow resistance as compared to flow through the plenum 56 and out of the pump connected exhaust pipe 58. The fluid flow restriction defined between the underside 33 of the housing 30 and that sector of the workpiece protruding through the slot 34 relative to the upper face of the electrode 16, under the velocity head produced by the pump connected to the outlet pipe 58, promptly and efficiently inducts the waste metal particles into the exhaust system, particularly as the liquid is accelerated in its passage through the line of spark erosion occuring at the most proximal lines of the surfaces of the workpiece and the matrix of the electrode.

While the invention has been shown and described in a preferred embodiment, it will be recognized that departures may be made therefrom within the scope of the invention, which is not to be limited to the details disclosed herein, but is to be accorded the full scope of the claims so as to embrace equivalent devices.

I claim:

1. Flow control apparatus for electrical discharge machining between an electrode element and a workpiece element, at least one of which is a rotary body of revolution within a tank of machining fluid, comprising:
    means for supporting the pair of elements in electrical discharge machining relationship to one another within the machining fluid during rotary movement of the rotary body;
    a means housing the rotary body and having an opening through which a peripheral portion of the rotary body moves angularly in passing through the machining zone between the two elements and partially obstructs said opening;
    said opening having area and shape characteristics relative to the protruding portion of the rotary body to provide a fluid passage for entry of the machining fluid from the machining zone into said housing;
    and means in fluid communication with the interior of said housing for exhausting machining fluid inducted through said opening to a location external of the tank, whereby the waste particles are entrained in the machining fluid at the machining zone and removed from the tank.

2. The apparatus of claim 1 in which said housing is internally formed with shape characteristics comprising an arcuate wall portion concentric with the axis of rotation of the rotary body and intersecting one edge of said opening, said wall portion defining a close rotary fit relative to the rotary body to inhibit passage of the machining fluid between said wall portion and the rotary body.

3. Apparatus as in claim 2 in which said shape characteristics comprise a second wall portion in opposition to said first wall portion and intersecting a second edge of said opening, said second wall portion being sufficiently outwardly offset beyond the periphery of the rotary body to define a relatively free passage for entrance of the machining fluid into said housing through said opening.

4. Apparatus as in claim 3 in which said second wall portion includes an arcuate sector concentric with the axis of rotation of the cylindrical element.

5. In an electrical discharge machining apparatus for cylindrical workpieces, the combination comprising:
    means to support the workpiece for rotation within tthe dielectric liquid tank of the apparatus;
    means to rotate the workpiece during electrical discharge machining thereof along longitudinal traces of the workpiece sequentially brought into machining zone registration with the electrode of the apparatus;
    a housing for the workpiece formed with a cavity within which the workpiece is rotatable, said housing being formed with a fluid inlet opening surrounding the zone of machining registration of the workpiece and the electrode, said cavity defining a fluid passage relative to the portion of the workpiece enclosed by said housing and in fluid communication with an outlet port for the fluid;
    and means for effecting flow of the liquid into said inlet opening and through said housing for exhausting via said outlet port to a location external of the tank of said apparatus for flushing waste metal particles out of the machining zone of registration of the workpiece and the electrode without dispersion of the particles into the liquid contained in the tank.

6. An apparatus as in claim 5 in which said housing has opposite end walls formed with through bores of a radius adapted for close running fits relative to opposite ends of the workpiece for impeding circulation of the dielectric liquid therethrough.

7. An apparatus as in claim 6 in which the mating engagement of the opposite ends of the workpiece with said through bores of said opposite end walls of said housing also serve to support said housing in place around the workpiece, and in which said means to support the workpiece for rotation includes a means for keying said housing against displacement angularly relative to the workpiece.

8. The apparatus of claim 5 in which said housing cavity includes an arcuate wall portion concentric with the axis of rotation of the workpiece and intersecting one edge of said opening, said wall portion being of a radius defining a close rotary fit relative to the workpiece to inhibit passage of the machining fluid between said wall portion and the workpiece.

9. Apparatus as in claim 8 in which said cavity includes a second wall portion in opposition to said first wall portion and intersecting a second edge of said opening, said second wall portion being sufficiently outwardly offset beyond the radius of the workpiece to define a passage relative to the periphery of the workpiece for free induction of the machining fluid into said cavity of said housing.

10. Apparatus as in claim 9 in which said second wall portion includes an arcuate sector of uniform radius concentric with the axis of rotation of the workpiece and that intersects said second edge of said opening.

11. An apparatus as in claim 9 in which the combination includes an electrode, said electrode being formed with a flat surface passing through the machining zone of registration of the workpiece and said electrode in substantially parallel relationship to the plane including said inlet opening of said housing.

12. Apparatus as in claim 11 in which said flat surface of said electrode is formed with a negative impression of a pattern desired to be machined onto the workpiece, and in which said means to rotate the workpiece turns the workpiece angularly in a sense of direction to carry machined portions of the workpiece initially past said second wall portion of said cavity.

13. Apparatus as in claim 12 in which said housing is formed with an external flat face within which said inlet opening is defined in substantially parallel relationship to said flat surface of said electrode in order to define a dielectric liquid passage through which said fluid is conducted towards said second edge of said slot to be inducted into said housing.

14. A process of removing waste particles from the machining zone between an electrode element and a workpiece element disposed in a tank containing a dielectric liquid, one of the elements comprising a revolving body of revolution, comprising:
defining a barrier to isolate one of the elements from flow therearound by the surrounding liquid in the tank otherwise than by flow through an aperture closely surrounding the machining zone;
and flowing the liquid from the tank through the machining zone and aperture for circulation past the isolated element to a location external of the tank, whereby waste particles are entrained in the removed liquid for transfer from the machining zone to the external location.

15. A process as in claim 14 including positioning the body of revolution as the isolated element with its axis of rotation located to restrict flow of liquid from the tank between one marginal edge of the aperture and the periphery of the rotating body of revolution.

16. A process as in claim 15 which includes defining the barrier to restrict flow of the liquid through an arcuate sector concentric with the axis of rotation of the body of revolution and intersecting the one marginal edge of the aperture.

* * * * *